United States Patent [19]

Lhospice

[11] Patent Number: 4,802,753
[45] Date of Patent: Feb. 7, 1989

[54] EYEGLASS FRAME WITH RESILIENT BRIDGE

[75] Inventor: Bernard Lhospice, Blois, France

[73] Assignee: Essilor International Cie Generale d'Optique, Creteil Cedex, France

[21] Appl. No.: 95,005

[22] Filed: Sep. 9, 1987

[30] Foreign Application Priority Data

Sep. 15, 1986 [FR] France ................ 86 12842

[51] Int. Cl.[4] .................. G02C 5/06; G02C 5/02; G02C 5/12
[52] U.S. Cl. ............................ 351/88; 351/126; 351/132; 351/137; 351/138
[58] Field of Search ........... 351/137, 88, 128, 76, 351/80, 126, 132, 138

[56] References Cited

U.S. PATENT DOCUMENTS 4,470,674 9/1984 Piampiano .................. 351/136

FOREIGN PATENT DOCUMENTS 2164074 7/1973 France .
2419526 10/1979 France .
2102150 1/1983 United Kingdom .
2123976 2/1984 United Kingdom .

Primary Examiner—Rodney B. Bovernick
Attorney, Agent, or Firm—Charles E. Brown; Charles A. Brown

[57] ABSTRACT

An eyeglass frame comprises two surrounds each receiving a respective lens. A bridge joining together the surrounds comprises a generally omega-shaped spring. This has two lateral lugs by each of which it is attached to a respective surround. Its middle part has two ends with concave sides facing towards each other and set back relative to the lateral lugs. A nose-side support arrangement is fitted to the bridge and comprises a U-shaped support having two branches each of which is interlocked with a respective end of the middle part of the bridge.

11 Claims, 1 Drawing Sheet

U.S. Patent    Feb. 7, 1989    4,802,753
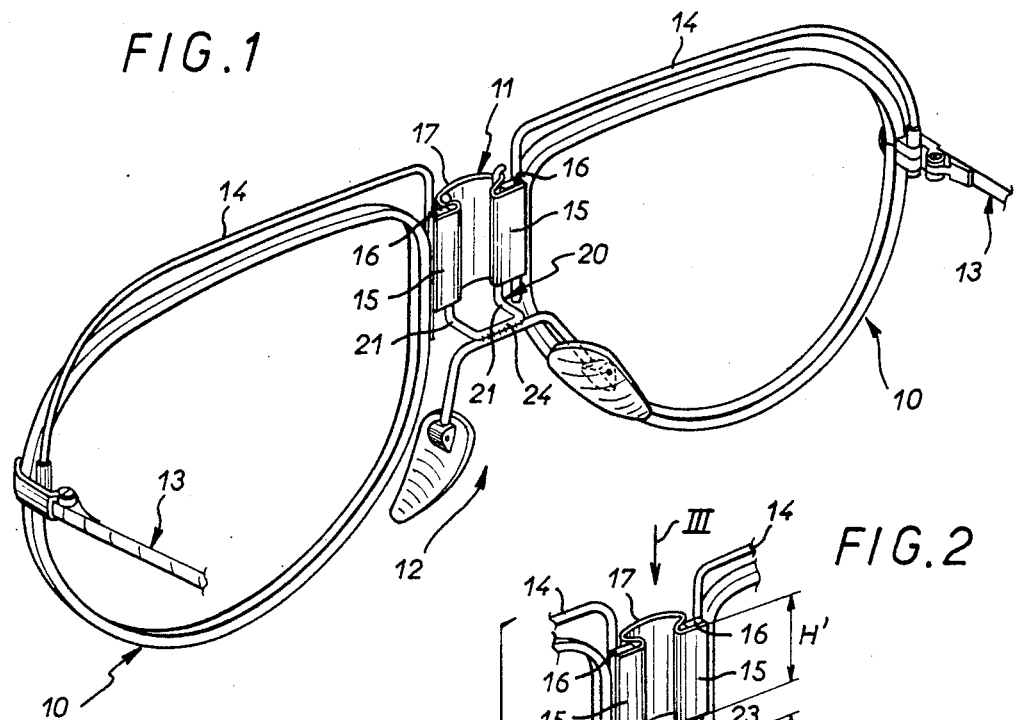
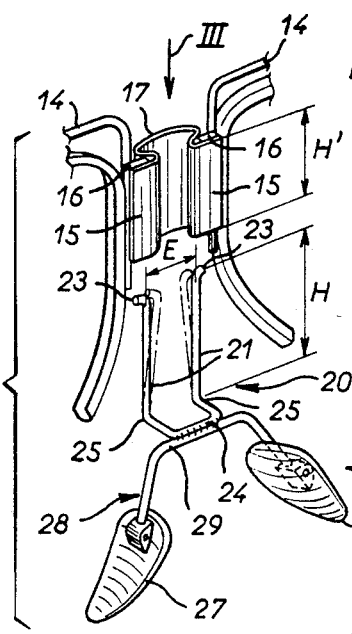
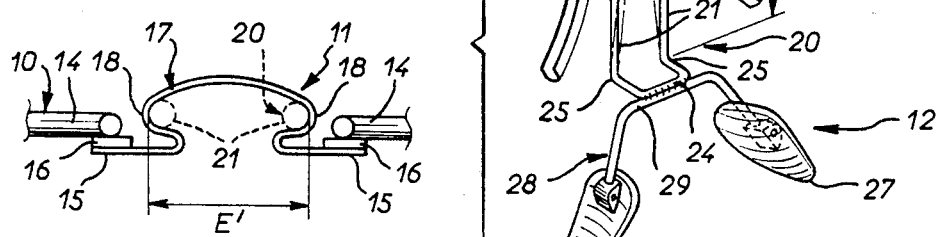
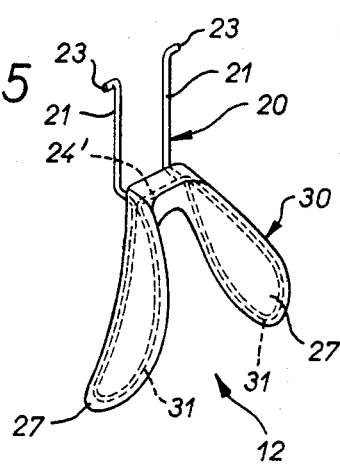
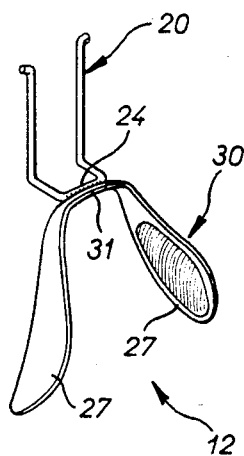

EYEGLASS FRAME WITH RESILIENT BRIDGE

BACKGROUND OF THE INVENTION

1. Field of the Invention

The present invention is generally concerned with eyeglass frames.

2. Description of the Prior Art

Known eyeglass frames generally comprise two surrounds adapted to receive the lenses and which are linked to each other by a central bridge with which are associated nose-side support means, either in the form of individual pads or a saddle-shape member defining such pads.

The present invention is more particularly directed to the case where the bridge comprises an omega-shaped spring comprising two lateral lugs by each of which it is attached to a respective surround and a middle part having two ends with their concave sides facing towards each other and set back relative to said lateral lugs.

A particular advantage of eyeglass frames fitted with a bridge of this kind is that they have a capacity for opening out elastically in such a way as to facilitate their adaptation to the specific shape of the face of the wearer and to retain them better on the face.

However, because of this very capacity for opening out, there results a modification to the position of the associated nose-side support means, these normally being attached directly to the corresponding surround and therefore moving with it.

Overall, the margin for adjusting the position of the nose-side support means is commensurately reduced.

A general object of the present invention is an arrangement which provides a very simple way of circumventing this disadvantage by further exploiting the inherent structure of the central bridge and which also has additional advantages.

SUMMARY OF THE INVENTION

The present invention consists in an eyeglass frame comprising two surrounds each adapted to receive a respective lens, a bridge linking said surrounds and comprising a generally omega-shaped spring having two lateral lugs by each of which is attached to a respective surround and a middle part having two ends with their concave sides facing towards each other and set back relative to said lateral lugs, and nose-side support means fitted to said bridge and comprising a U-shaped support member having two branches each of which is interlocked with a respective end of said middle part of said bridge.

In practise each of the branches of the support member is interlocked with the concave side of the middle part of the bridge, being simply hooked elastically over it.

Separated in this way from the surrounds, the nose-side support means are not affected by the movement away from each other of the surrounds when the assembly opens out elastically and their capacity for adjustment in position is then advantageously comparable with that of nose-side support means as fitted at a fixed point to conventional eyeglass frames.

Also, no specific means have to be employed for fixing the nose-side support means, as such fixing is procured by the inherent and original shape of the bridge.

Finally, because of this fixing method, it is advantageously possible to fit either type of nose-side support means (separate pads or saddle-shape member) to the same eyeglass frame, and even to change between the different types at will.

The result is great ease of adaptation for the wearer, enhancing his comfort.

The characteristics and advantages of the invention will emerge from the following description given by way of example only with reference to the appended schematic drawings.

BRIEF DESCRIPTION OF THE DRAWINGS

FIG. 1 is a partial view in perspective of an eyeglass frame in accordance with the invention, as seen from behind.

FIG. 2 is an exploded view corresponding to part of FIG. 1 and showing the bridge of the eyeglass frame.

FIG. 3 is a plan view in the direction of the arrow III in FIG. 2, to a larger scale.

FIGS. 4 and 5 are perspective views of suitable nose-side support means.

DESCRIPTION OF THE PREFERRED EMBODIMENTS

As shown in the figures, and in a manner that is known in itself, the eyeglass frame in accordance with the invention comprises two surrounds 10 adapted to receive two lenses (not shown) joined to each other by a central bridge 11 and associated with which, on the same side as the nose, are nose-side support means 12.

On the side opposite the central bridge 11, meaning the same side as the temples, a lateral support member or temple 13 is hinged to each surround 10.

The specific construction of the surrounds 10, which are here of metal with an additional arch member 14 at the top, is not relevant to the present invention and, not forming any part of the present invention, will not be described in detail here.

In a manner that is also known in itself the central bridge 11 is in the form of an omega-shaped spring, by which is meant a spring comprising two lateral lugs 15 through each of which it is attached to a respective surround 10, through the intermediary of a spacer 16 in this instance, and a middle part 17 having two ends 18 with their concave sides facing towards each other and set back relative to said lateral lugs 15.

The spring which in the way shown here constitutes the central bridge 11 may be formed by a section of spring steel strip appropriately cut out and shaped.

In the case of metal surrounds 10, the assembly is welded together.

These arrangements are in no way limiting on the invention, of course.

In accordance with the invention, the central bridge 11 is used to fit nose-side support means 12 which comprise to this end a U-shaped support member 20, constituting an adapter, each branch 21 of which is interlocked with the concave side of the respective end 18 of the middle part 17 of the central bridge 11.

In other words, the ends 18 of the central bridge 11 each being generally S-shaped, it is through the concave inside part of each end, that is to say the portion thereof farthest away from the corresponding lug 15, that the branches 21 of the support member 20 of the nose-side support means 12 are interlocked with the central bridge 11.

The branches 21 of the support member 20 shown here are elastically deformable and can therefore be moved towards or away from each other in a resilient way, as schematically represented in dashed outline in FIG. 2.

They are designed so that when unstressed they diverge slightly from each other, the distance E between them as measured at their free ends being slightly greater than the distance E' between the ends 18 of the middle part 17 of the central bridge 11, as measured at the inside surface of their concave bottom.

The branches 21 of the support member 20 of the nose-side support means 12 each have an upstanding tang 23 at their free end, these tangs facing away from each other and being adapted to enable them to be hooked over the upper edge of the central bridge 11.

The branches 21 of the support member 20 have respective elbow bends 25 in corresponding relationship to each other between their free end and the end at which they merge with the middle part 24 that lies between them. These are perpendicular to the plane defined by them and the upstanding tangs 23 and are adapted to enable them to bear on the lower edge of the central bridge 11.

The height H of the main part of the branches 21 of the support member 20, which is that between the upstanding tang 23 and the elbow-bend 25, is slightly greater than the height H' of the central bridge 11.

The support member 20 may be formed by appropriately cutting and bending round cross-section wire.

This arrangement is obviously not limiting on the invention, however.

In addition to the support member 20, the nose-side support means 12 comprise, in the known manner, nose-side bearing members.

In the embodiments specifically shown in FIGS. 1 and 2 these are bearing pads 27 which are not in one piece with the support member but are appropriately attached to it.

Each bearing pad 27 is individually articulated to the ends of a support beam 28 the middle part 29 of which is welded to the middle part 24 of the support member 20.

As an alternative to this (FIG. 4), the bearing pads 27 are respective parts of a saddle-shaped member 30 which has a middle part 31 through which it is attached to the middle part 24 of the support member 20 in substantially the same way as previously described.

In another embodiment (FIG. 5) the saddle-shaped member 30 providing the bearing pads 27 is molded onto the support member 20, the middle part 24' of which is shaped to form an armature for these bearing members.

The middle part 24' of the support member 20 forms a loop 31 inside each of the bearing pads 27.

To fit the nose-side support means 12 it suffices, in accordance with the invention, to move the branches 21 of the support member 20 of the nose-side support means 12 elastically towards each other and to insert them into the cylindrical member formed by the central bridge 11 until their elbow bends 25 come into abutting relationship against the lower edge of the central bridge 11.

The branches 21 of the support member 20 of the nose-side support means 12 are then released and their upstanding tangs 23 hook over the upper edge of the central bridge 11, bearing elastically against the concave bottom of the ends 18 thereof, which suffices to secure the nose-side support means 12 to the central bridge 11.

It is to be understood that the eyeglass frame in accordance with the invention may be fitted with a decorative member (not shown) adapted to be attached over all or part of the central bridge 11, in order, for example, to hide the upstanding tangs 23 of the branches 21 of the support member 20 of the nose-side support means 12.

The present invention is not limited to the embodiments described and shown, but encompasses any variant execution thereof.

Specifically, although in the embodiments specifically described and shown the middle part of the central bridge is of generally rounded shape between its lateral lugs, this is not necessarily so, and the central portion of this middle part may be flattened to a greater or lesser degree.

Nor is the scope of the present invention exceeded by fitting the branches of the support member of the nose-side support means to the outside, convex part of the ends of the middle part of the central bridge, that nearest the lateral lugs of the latter, the support member then having to be fitted to the central bridge by moving the branches apart elastically instead of moving them towards each other elastically.

In either case, the invention obtains further benefit from the central bridge by using it to fix the nose-side support means, for which purpose its existing shape is sufficient.

I claim:

1. An eyeglass frame comprising two surrounds, each of said surrounds being adapted to receive a respective lens, a resilient bridge linking said surrounds to permit relative movement of the surrounds and the frame to adapt to a wearer's face, said resilient bridge comprising a strip spring of omega-shaped cross-section, said spring having opposed lateral lugs attached to the respective surrounds, a middle part and a generally converging connecting zone connecting the middle part to each of said lateral lugs, a nose-side support means being clipped to said bridge and comprising a U-shaped support member having two branches, each of said branches being held in engagement with a respective one of said connecting zones.

2. An eyeglass frame according to claim 1, wherein each of said branches of said support member is received in a concave portion of said strip spring omega-section between said middle part and an adjoining one of said connecting zones.

3. An eyeglass frame according to claim 1, wherein said branches of said support member are elastically deformable towards and away from each other to facilitate engagement of said branches into said bridge.

4. An eyeglass frame according to claim 1, wherein said branches of said support member have tangs at their free ends for engagement with an upper edge of said bridge to hold said support member in postion on said bridge.

5. An eyeglass frame according to claim 3, wherein said branches are connected to each other by a middle part of said support member, each of said branches having an elbow bend disposed between its free end and its connection to said middle part of said support member.

6. An eyeglass frame according to claim 5, wherein the height of each said of branches between its elbow bend and its free end being slightly greater than the height of said bridge.

7. An eyeglass frame according to claim 1, wherein said nose-side support means carries bearing members separate from said support member and attached thereto.

8. An eyeglass frame according to claim 1, wherein said nose-side support comprises bearing members encapsulating an extension of said support member, a middle part of said support member defining reinforcing means for said bearing members.

9. An eyeglass frame according to claim 8, wherein said extension of said support member forms a loop inside each of said bearing members.

10. An eyeglass frame according to claim 2, wherein said convergent connecting zones are S-shaped.

11. An eyeglass frame comprising two surrounds, each of said surrounds being adapted to receive a respective lens, a resilient bridge linking said surrounds to permit relative movement of the surrounds and the frame to adapt to a wearer's face, said resilient bridge comprising a strip spring of omega-shaped cross section, said spring having opposed lateral lugs attached to the connecting zone connecting the middle part to each of said lateral lugs, a nose-side support means elastically clipped to said bridge and comprising a U-shaped support member having two branches, each of said branches being held in engagement with a respective one of said connecting zones whereby the position of the support means is substantially unaffected by movement of the surrounds relative to each other.

* * * * *